US005649666A

United States Patent [19]
Lewis

[11] Patent Number: 5,649,666
[45] Date of Patent: Jul. 22, 1997

[54] MOTOR-POWERED SPREADING APPARATUS FOR USE WITH ARTICULATING DUMP BOXES

[75] Inventor: J. Harry Lewis, 68 Glass Ave., London, Ontario, Canada, N5W 1Z7

[73] Assignee: J. Harry Lewis, London, Canada

[21] Appl. No.: 638,131

[22] Filed: Apr. 26, 1996

Related U.S. Application Data

[63] Continuation of Ser. No. 214,132, Mar. 17, 1994, abandoned.

[30] Foreign Application Priority Data

Mar. 25, 1993 [CA] Canada ................................. 2092460

[51] Int. Cl.⁶ .............................. A01C 15/12; E01C 19/20
[52] U.S. Cl. ..................... 239/657; 239/675; 239/676; 239/687
[58] Field of Search ............................ 239/657, 675, 239/676, 687, 650, 681

[56] References Cited

U.S. PATENT DOCUMENTS

| 2,003,628 | 6/1935 | Chadwick | 239/657 |
| 2,484,325 | 10/1949 | Wachter | 239/657 |
| 2,698,184 | 12/1954 | Bowen | 239/657 |
| 3,510,066 | 5/1970 | Swenson | 239/657 |
| 4,157,150 | 6/1979 | Hetrick | 239/657 |

FOREIGN PATENT DOCUMENTS 641421 5/1962 Canada ................................. 239/657

*Primary Examiner*—Lesley D. Morris
*Attorney, Agent, or Firm*—R. Craig Armstrong

[57] ABSTRACT

A gasoline motor powered spreading apparatus for use with vehicles equipped with articulating dump boxes is described. The spreading apparatus includes a hopper assembly, a spinner, a mounting platform for a gasoline powered motor, a mounting platform levelling system, and a multiple output gearbox. The entire assembly is configured to substitute directly for most conventional vehicle tailgates. The levelling system ensures that the motor (platform) is level through the full range of articulation of the dump box in order to provide efficient operation of a gasoline powered motor. The multiple output gearbox provides variable gear ratios to power peripherals such as the spinner and the auger. The gasoline powered motor as well as the peripherals may be manipulated remotely from the driver's area of the vehicle. The apparatus is easily installed or removed and requires limited modification to the vehicle.

12 Claims, 6 Drawing Sheets

MOTOR-POWERED SPREADING APPARATUS FOR USE WITH ARTICULATING DUMP BOXES

This application is a continuation of application Ser. No. 08/214,132, filed Mar. 17, 1994, now abandoned.

BACKGROUND OF THE INVENTION

1. Field of the Invention

This invention relates to an improved material spreading apparatus to be used in conjunction with articulating dump boxes. The apparatus is designed to facilitate a gasoline powered motor that is kept level during articulation through the use of a pivotting connection and an attached levelling system.

2. Description of the Prior Art

Material spreading apparatus is used for numerous applications such as road maintenance which requires the even spreading of salt or sand on the surface of roadways. Other applications include landscaping and agriculture which may require a consistent layering of mulch, moss or fertilizer. All of these types of materials can be effectively applied with the use of a spreading apparatus.

In the past, spreading apparatus have been attached to the rear of vehicles and powered by means of several sources. Often pickup trucks equipped with articulating dump boxes are used as the vehicle to which the apparatus is attached, while in higher volume applications the spreading apparatus may be attached to dump trucks.

Quite often, these units are powered using hydraulics. This is necessary as the operating components of spreading apparatus must remain functional at angles of 10–50 degrees or more. Hydraulic operation is generally not effected by such conditions. Gas-powered motors, on the other hand, can run well at slight deviations from horizontal up to approximately 10 degrees, but cannot operate in the extreme conditions described without extensive modifications, if at all.

Consequently, a typical spreading apparatus is powered by hydraulics and requires the installation of hydraulic pump(s) driven by the vehicle's primary engine. Hydraulic lines leading from the pump(s) to corresponding hydraulic motors on the spreading apparatus are then attached. Numerous hydraulic lines are usually required to facilitate both a spinner and the generally required auger.

Valve and control means must also be provided to allow user control from the driver's area of the vehicle. As these units are hydraulic, the flow rates will vary with primary engine speed. Thus the control means for spinner and auger speed vary with the speed of the vehicle requiring continual adjustment during normal vehicle operation.

As a result, these hydraulic solutions are very expensive due to the number of hydraulic components employed and extensive retrofitting required.

Attaching or removing all these components at the start or end of the winter season is difficult, expensive and time consuming. Often times therefore, the equipment remains installed year round, reducing the functionality of the vehicle for other purposes.

Another type of known spreading apparatus is powered by electric motors. These motors require large amounts of electrical energy due to the necessary power requirements of the spinner and auger. This presents a problem to the host vehicle, in that the factory installed alternator is not usually capable of supplying the energy requirements. This may entail the modification of the vehicle's electrical system by means of enlargement of the alternator and result in significant expense. The high torque motors required are also very expensive.

A hybrid solution of hydraulics to run the higher powered auger and an electrical drive means to run the spinner is also possible.

In the past, conventional spreading apparatus for use with articulating dump boxes have generally not utilized direct drive gasoline powered motors. Inherent inefficiencies occur in gasoline powered motors when they are tilted past a critical angle, and in many cases severe tilting prevents proper operation at all. This has previously prevented the use of such drive means in articulating applications.

SUMMARY OF THE INVENTION

It is therefore an object of the invention to provide a spreading apparatus that has the ability to operate in conjunction with a common gasoline powered motor for use with articulating dump boxes.

It is a further object of the invention to provide a spreading apparatus that is easily installed and avoids extensive equipment modifications on the host vehicle.

It is yet a further object of the invention to provide the operator with simple remote control operation such that complete operation of the spreading apparatus may take place in the cab of the vehicle from the driver's position.

In the invention, the spreading apparatus is primarily comprised of a hopper assembly, a spinner unit, a motor/gearbox support platform and a motor levelling means in order to allow efficient operation of a common gasoline powered motor.

The invention provides a platform that is consistently level with respect to the vehicle in order to accommodate a common gasoline powered motor. The invention also provides a gearbox with the ability to reduce and distribute power input to several output shafts. Installation requirements are drastically reduced and simplified by use of the present invention.

The present invention is configured so that the majority of its components can be entirely installed or removed from the vehicle in a quick and simple fashion. Accordingly, when the spreading apparatus is only needed occasionally, as with landscaping or agricultural needs, or more seasonal requirements, as with road maintenance, the vehicle does not have to carry the entire weight of the apparatus when it is not needed. Thus, convenience and utility of the vehicle for other functions is increased, as well as making the vehicle more aesthetically pleasing while consuming less fuel.

Thus there is provided a motor-powered spreading apparatus for use with a vehicle equipped with an articulating dump box, said apparatus comprising a hopper assembly to receive the material to be spreaded, an opening in said hopper to permit said material to escape, a spinner positioned to receive the material from the hopper, an auger located in said hopper assembly to convey the material to said spinner, a gasoline-powered motor connected to drive said auger, a drive means connected to drive said spinner, a platform for said gasoline-powered motor, said platform pivottally connected to said hopper assembly, and a levelling assembly connecting said platform to said vehicle such that as the dump box articulates the mounting platform and thus the motor remain in approximately the same horizontal plane as the vehicle. An alternative embodiment utilizes a simplified motor platform or even dispenses with the platform altogether. Levelling is provided by motor weighting and/or configuration with rotation prevention means being provided to prevent the motor torque from spinning the motor.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which.

DETAILED DESCRIPTION OF THE PREFERRED EMBODIMENT

Figure 7:
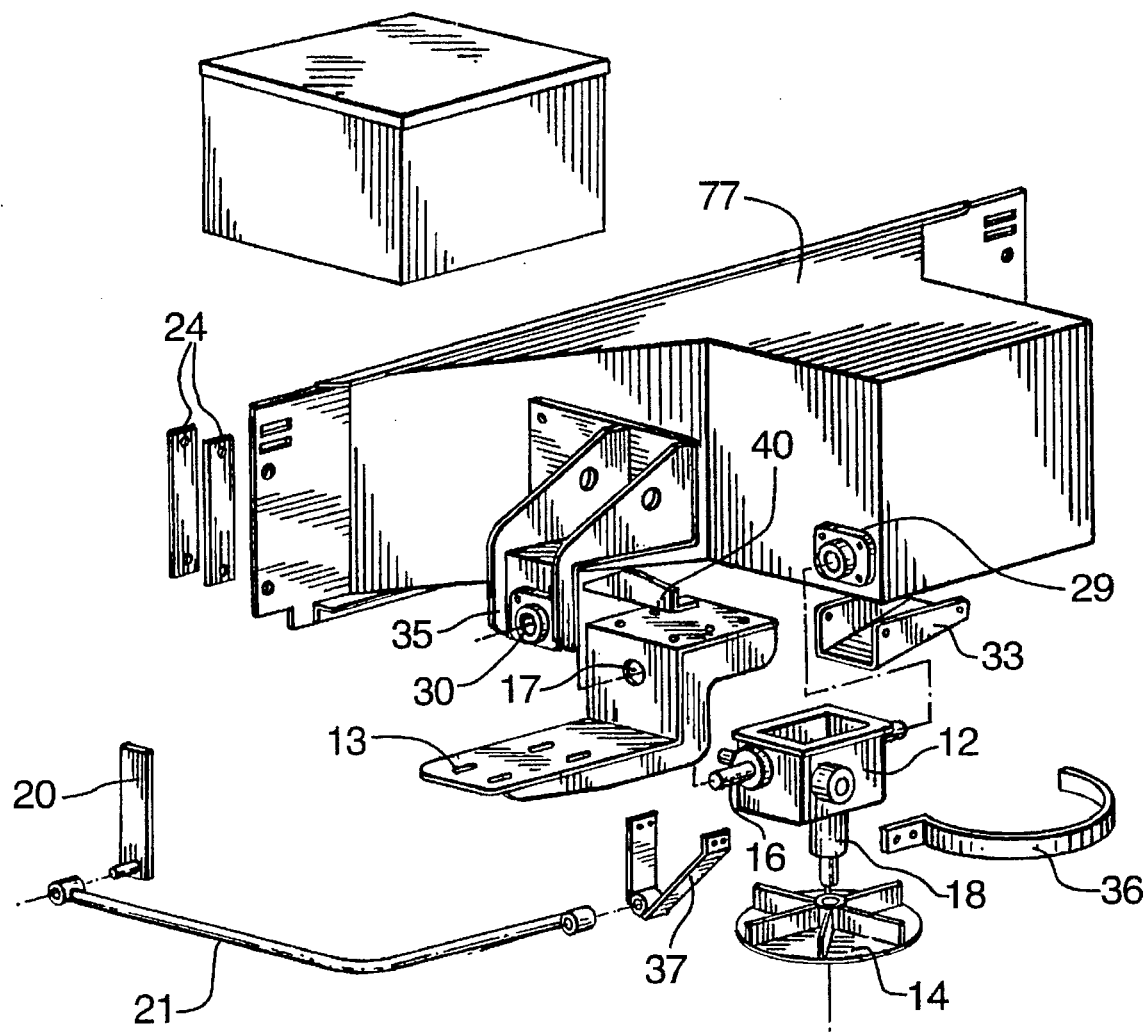
FIG. 7 is an exploded perspective view of the spreading apparatus.

Referring to FIG. 7, the spreading apparatus is seen to be comprised of several distinct components, including a hopper assembly 77, a motor/gearbox mount 13, a gearbox 12, a spinner assembly 14, and a levelling system further comprised of a leveller pivot bracket 37, a leveller arm 21 and a vehicle leveller base 20.

The hopper assembly 77 contains a compatible back plate that is configured to replace most conventional tailgates. Mounting spacers 24 are used to facilitate vehicle connection. The hopper assembly 77 further comprises two diagonal plates on each side which extend outwardly from the back plate and on a convergent path, generally defining a square funnel shape, and which diagonal plates connect with three more plates rigidly attached at right angles to each other, forming a generally cube-shaped body section, being the enclosed containment area of the hopper assembly 77. There are of course a number of variations that could be employed with respect to the shape and dimensioning of the hopper assembly.

Figure 8:
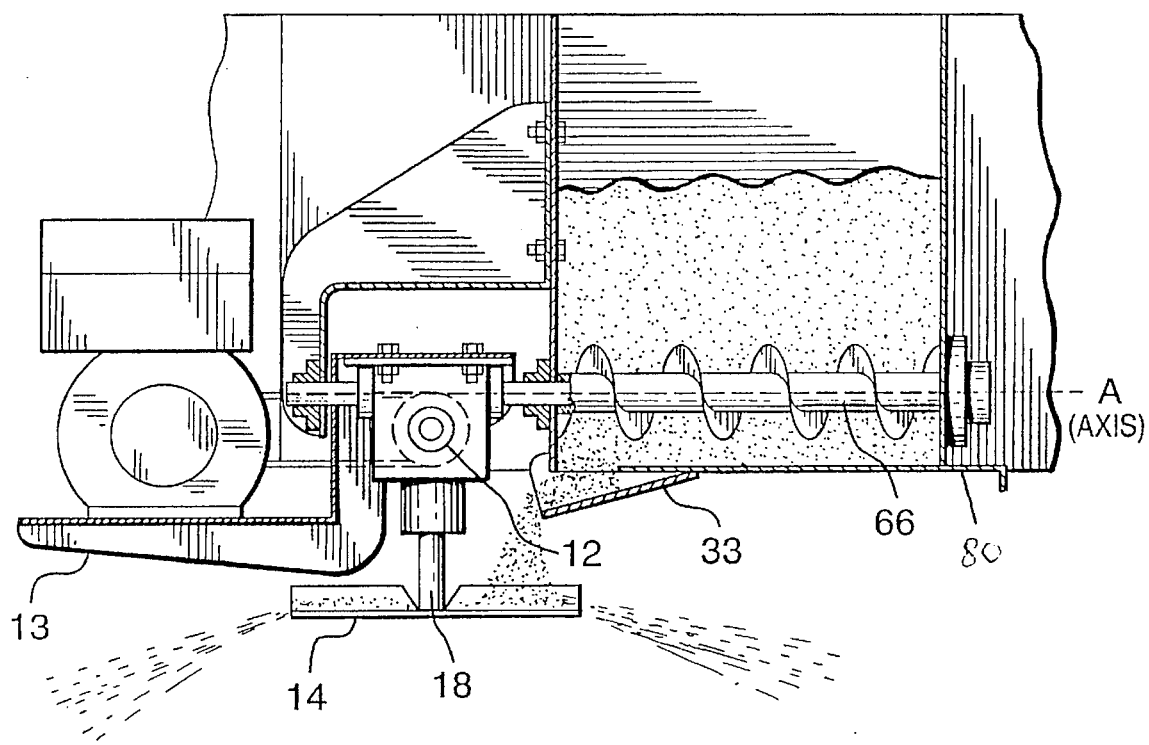
FIG. 8 is a sectional view about the line 8—8 of FIG. 3 of the spreading apparatus.

Referring also to FIG. 8, within the hopper assembly 77, an rotating auger 66 is fitted transversely to facilitate material removal. At the base of the hopper assembly 77, there is a material chute 33 which directs the material from the hopper to the spinner 14. The spinner is protected by a spinner guard 36.

Again referring to FIG. 7, a motor support bracket 35 is rigidly connected to the side of the hopper assembly 77 by means of bolts or the like. A motor/gearbox mount 13 is pivotally connected to the base of the hopper assembly 77 by means of flange bearing 30. A rotation stop 40 is provided whose purpose is to prevent rotation during shipping etc. when the unit is not mounted to a vehicle. The flange bearing 17 allows hopper assembly 77 to move with the articulating dump box while allowing the motor/gearbox mount 13 to remain level.

The vehicle leveller base 20 must be rigidly anchored to a fixed component on the vehicle such as the bumper or frame by means of bolts or the like. The leveller pivot bracket 37 forms a triangular support when it is rigidly attached to the base of the motor/gearbox mount 13 by means of bolts or the like. One end of the leveller arm 21 pivotally connects to the apex of the leveller pivot bracket 37 while the other pivotally connects to the vehicle leveller base 20.

Figure 5:
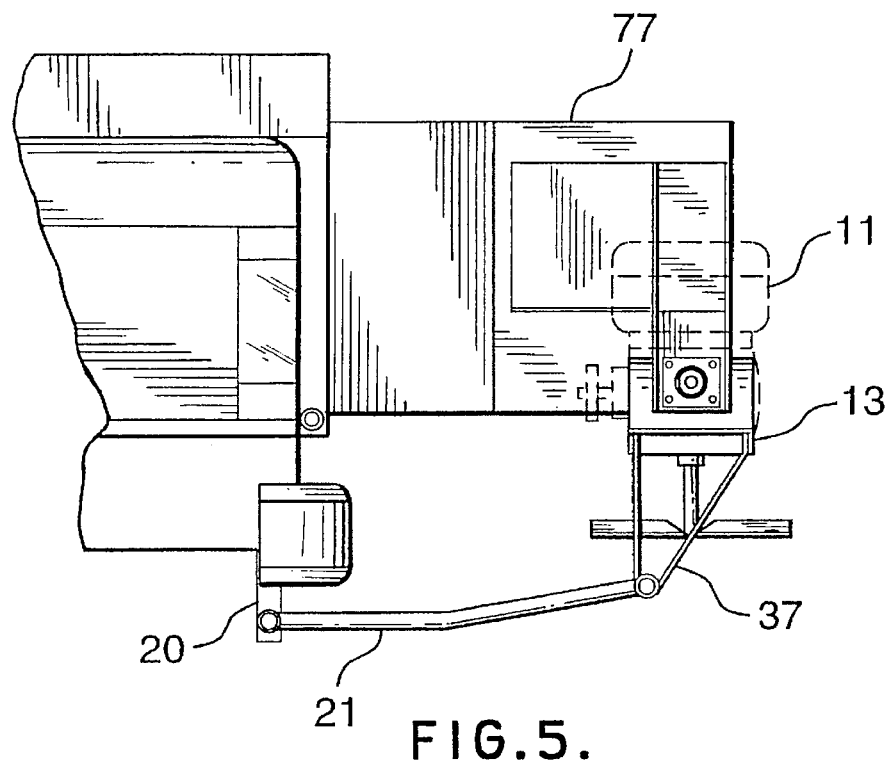
FIG. 5 is a side view of the spreading apparatus attached to a vehicle equipped with an articulating dump box in a horizontal position.
Figure 6:
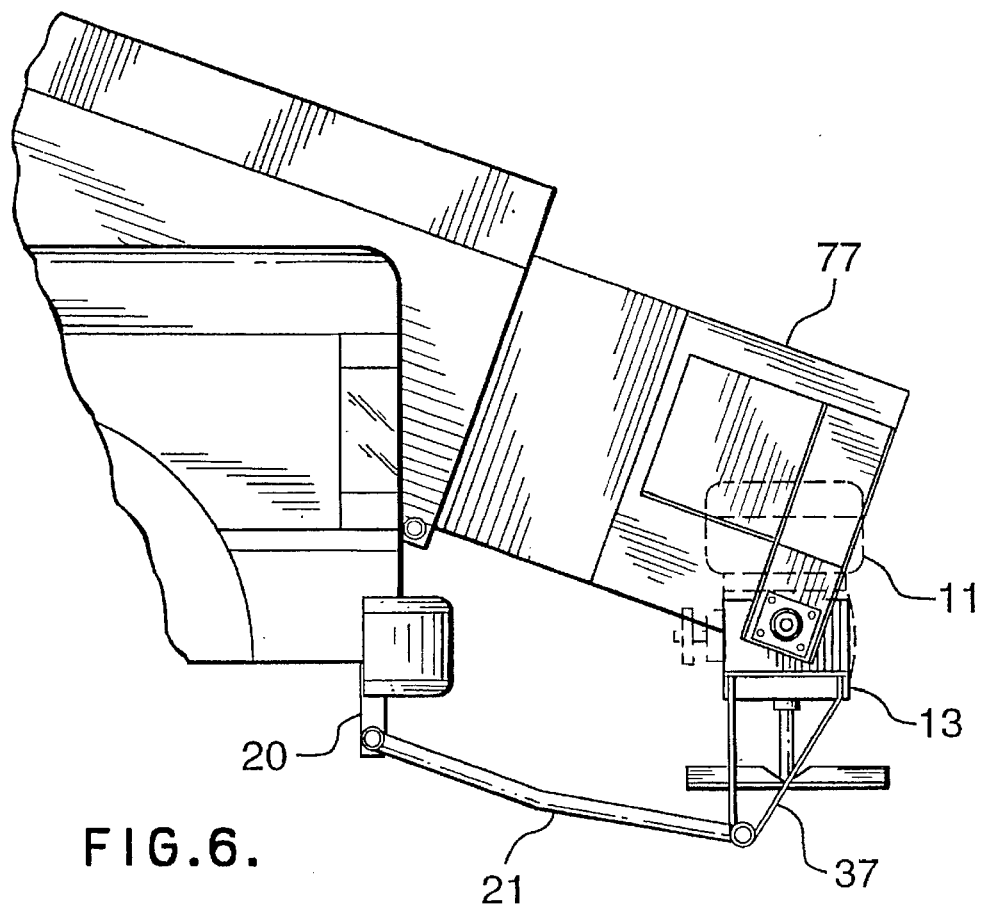
FIG. 6 is a side view of the spreading apparatus attached to a vehicle equipped with an articulating dump box in an inclined position.

Referring to FIGS. 5 and 6, the levelling system is seen in operation. The leveller arm 21 is fixed at a set distance from the motor/gearbox mount 13 such that it provides a level platform when the dump box is in a horizontal position. The opposite end of the leveller arm 21 is designed such that the arc transcribed by the motion of the articulating dump box is sufficient to maintain this level platform through the full range of articulation. This consistently level platform allows for the efficient operation of a gasoline powered motor 11 and clutch 9 mounted on the motor/gearbox mount 13. The levelling system must be of considerable strength in order to resist torque produced by the gasoline powered motor.

One could adapt the motor platform to a variety of configurations. For example, a simple bracket could be used instead of a platform. Possibly, the motor platform could even be dispensed with and the motor mounted directly to the hopper assembly using pivotal connections. In such a case, the levelling arm could be connected to the vehicle and then directly connected to the motor as opposed to the motor platform.

Another embodiment could include a modification to the rotation stop means that could be used to prevent rotation of the motor during operation as opposed to simply during shipping. In such an embodiment, the levelling arm would be replaced with a modified rotation stop means. Levelling itself could be achieved using motor weights or alternatively configuring the motor with the majority of the weight below the connection point, being the output shaft.

All such alternative mounting, levelling and/or rotation stop means, although not specifically described herein, fall within the scope of this invention as claimed.

Again referring to FIG. 7, the gearbox 12 is rigidly mounted to the base of the motor/gearbox mount 13 by means of bolts or the like. An gearbox input shaft is located on the rear of the gearbox (not shown) and is connected to the output shaft of the motor via an electrically operated clutch (not shown). The clutch is operable via appropriate connection means from the driver's area of the vehicle.

One gearbox output shaft 16 connects to the auger 66 and is positioned on one end through a guide hole 17 in the motor/gearbox mount 13. The other end of the auger drive shaft 16 is connected to the flange bearing 29 affixed on the side of the hopper assembly 77. The spinner assembly 14 connects directly to a spinner drive shaft 18 protruding from the lower side of the gearbox 12.

A spinner guard 36 is rigidly attached to the side of the motor/gearbox mount 13 in order to provide security around the rotating spinner assembly 14.

Figure 1:
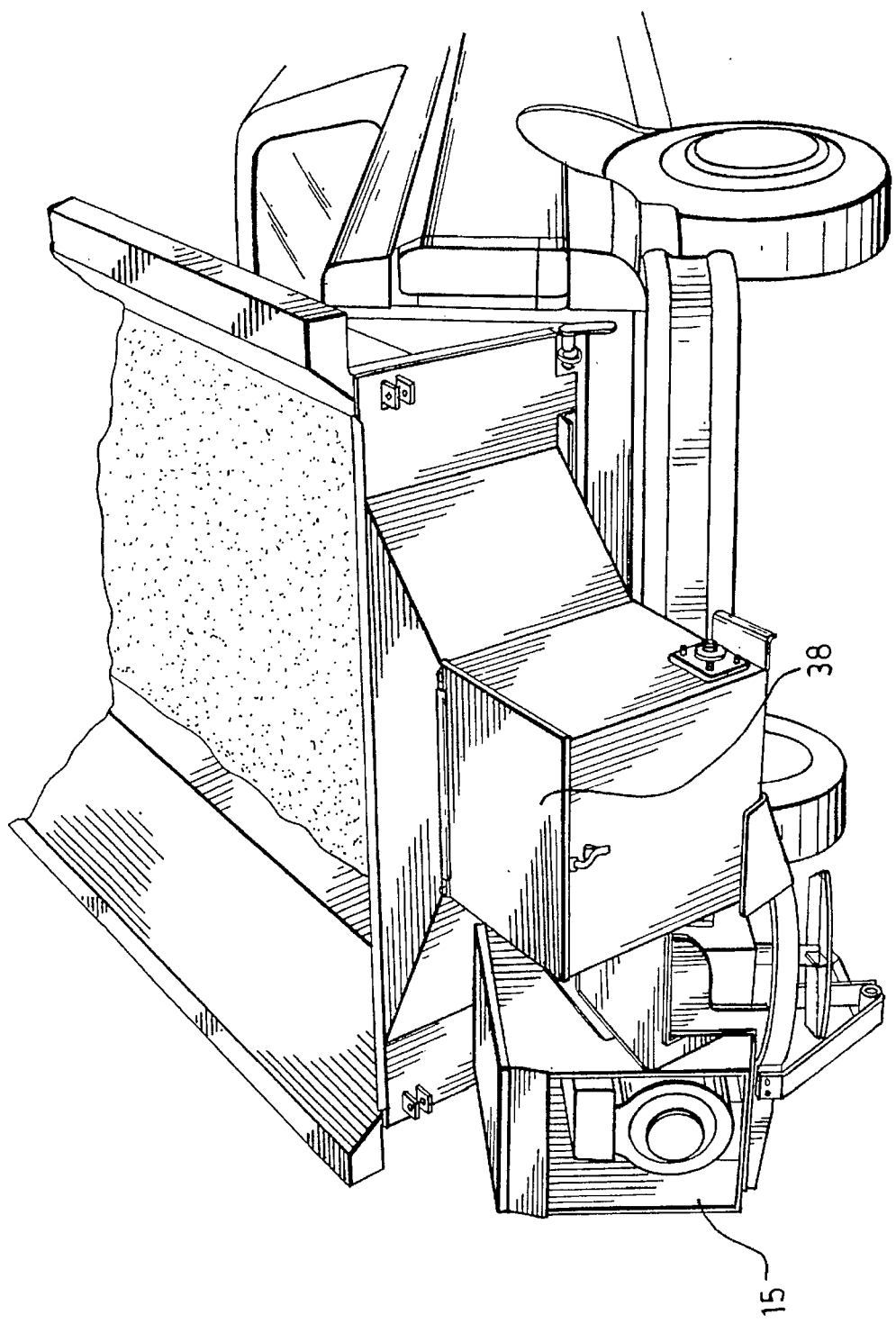
FIG. 1 is a perspective view of the spreading apparatus attached to a vehicle equipped with an articulating dump box.
Figure 2:
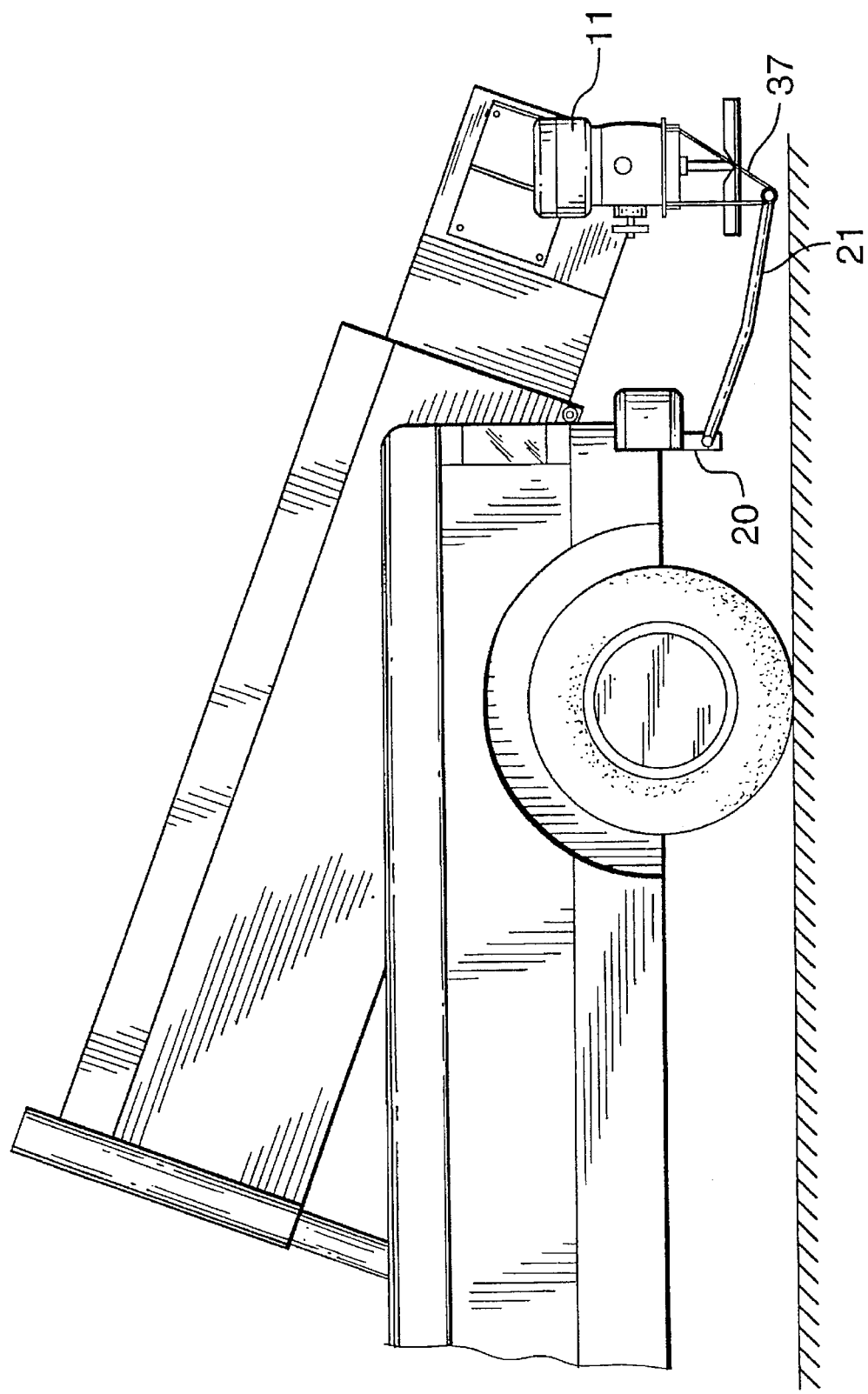
FIG. 2 is a side view of the spreading apparatus attached to a vehicle equipped with an articulating dump box.

Referring to FIG. 1, a motor enclosure 15 provides safety and prevents possible damage to the gasoline powered motor 11. The hopper assembly 77 is also fitted with a lid 38 in order to prevent accidental access to the spinning auger during operation. FIG. 2 shows how in operation the motor is maintained level with respect to the host vehicle.

Figure 3:
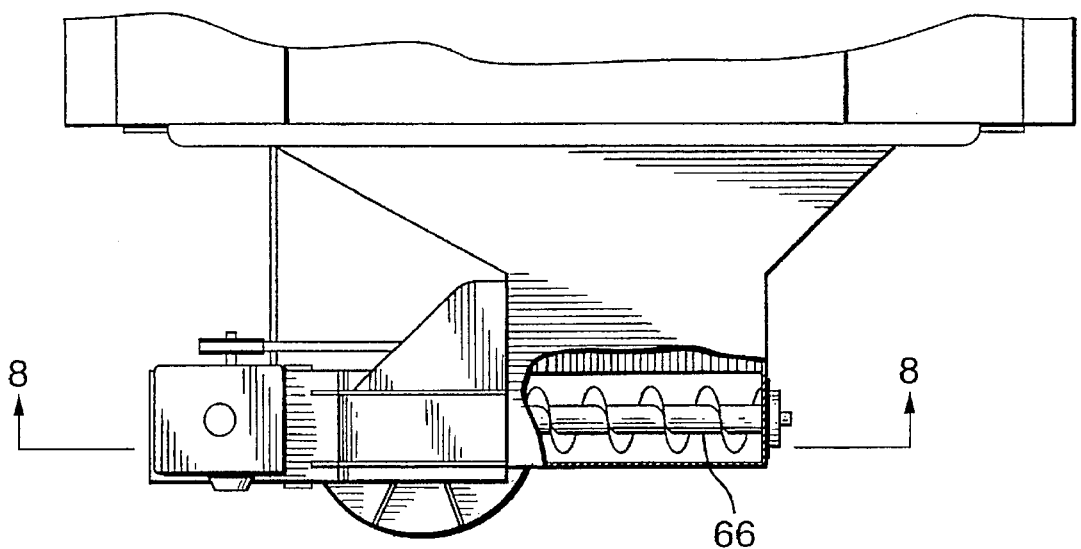
FIG. 3 is a top view of the spreading apparatus attached to a vehicle.
Figure 4:
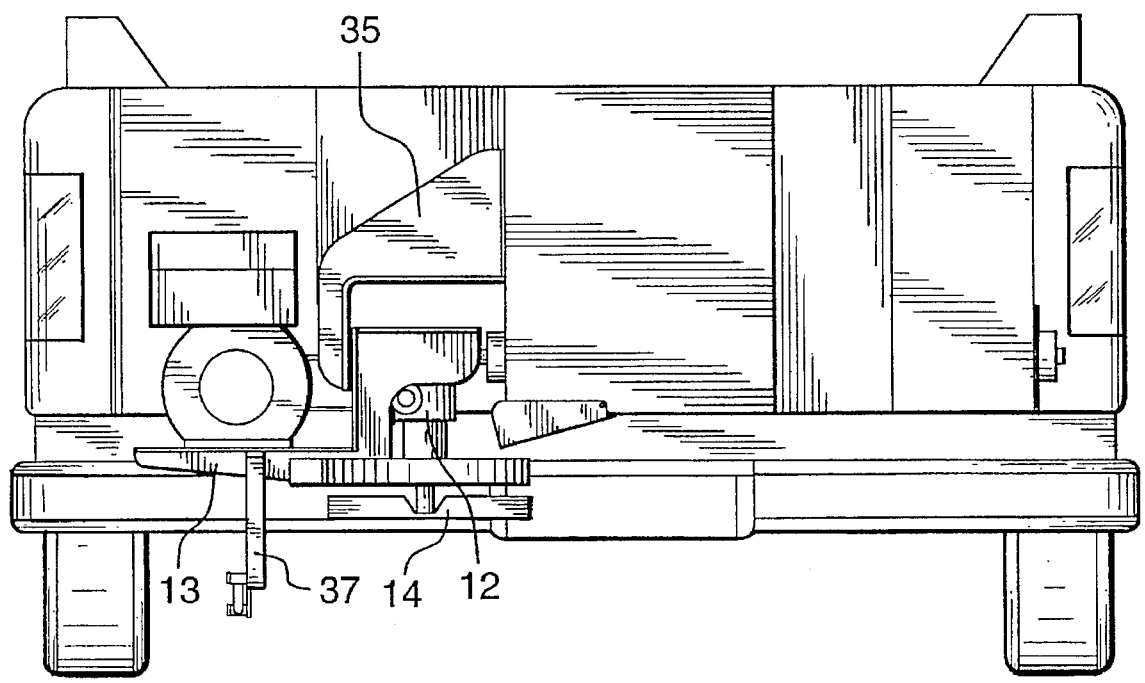
FIG. 4 is a rear view of the spreading apparatus attached to a vehicle.

Referring to FIGS. 1, 3, and 4 it can be seen that the entire apparatus simply attaches to the rear of the vehicle, replacing the tailgate on the dumpbox. A part sectional view is shown revealing the auger 66 that is housed in the lower portion of the hopper 77. The hopper funnels the material towards the auger 66 via gravity feed. Internal baffles (not shown) may be optionally included inside the hopper to assist in regulating material flow.

Referring now to FIG. 8 the material flow can be seen in the sectional view. The material generally is moved towards the material chute 33 via the auger 66. The longitudinal axis A of the auger 66 is directly in line with the gearbox 12 so as to eliminate the need for a universal joint or the like. The material falls from the material chute 33 onto the rotating spinner 14 powered by the spinner drive shaft 18 extending from the lower portion of the gearbox 12. The material is then distributed onto the roadway, field etc.

The gearbox is a variable ratio output so that the rotating speed of the spinner is different than the auger. Generally the auger is required to rotate more slowly than the spinner. Gate slide bar 80 is also used to control material flow. This slide bar 80 is manually adjustable to allow a larger or smaller opening to the material chute which is fixed and not adjustable in the embodiment shown herein.

It will be appreciated that the above description relates to the preferred embodiment by way of example only. Many variations on the invention will be obvious to those knowledgeable in the field, and such obvious variations are within the scope of the invention as described and claimed, whether or not expressly described.

What is claimed as the invention is:

1. A motor-powered spreading apparatus for use with a vehicle equipped with an articulating dump box, said dumpbox normally having a tailgate positioned across a tailgate opening, said apparatus comprising:

a hopper assembly to receive the material to be spread, where said hopper assembly is configured to completely replace the otherwise normally present tailgate of said articulating dump box and to span across the tailgate opening;

an opening in said hopper assembly to permit said material to escape;

a spinner positioned to receive the material from the hopper assembly;

an auger located in said hopper assembly to convey the material to said spinner;

a gasoline-powered motor connected to drive said auger;

a drive means connected to drive said spinner;

a mounting platform for said gasoline-powered motor, said platform pivotally connected to said hopper assembly; and a levelling assembly connectable between said mounting platform and said vehicle, such that as the dump box articulates the mounting platform and thus the motor remain approximately level.

2. A motor-powered spreading apparatus as recited in claim 1, where said apparatus further comprises a gearbox connected to the motor and the auger.

3. A motor-powered spreading apparatus as recited in claim 2, where said gearbox is configured with more than one output shaft to permit said motor to also drive said spinner.

4. A motor-powered spreading apparatus as recited in claim 2, further comprising a clutch connected to said motor and said gearbox.

5. A motor-powered spreading apparatus as recited in claim 4, wherein the clutch is electrically-operated.

6. A motor-powered spreading apparatus as recited in claim 5, wherein the clutch is connected to remote control means locatable in the driver's area of the vehicle.

7. In combination:

a motor vehicle equipped with an articulating dump box, said dump box having a cargo bed and sidewalls rising vertically from opposite side edges of the cargo bed and extending to a rear end of said cargo bed, and a tailgate normally mounted between said sidewalls across a tailgate opening at said rear end; and, a motor-powered spreading apparatus for attachment to said vehicle, said apparatus comprising:

a hopper assembly to receive the material to be spread, where said hopper assembly is configured to completely replace the otherwise normally present tailgate of said articulating dump box and to span across the tailgate opening;

an opening in said hopper assembly to permit said material to escape;

a spinner positioned to receive the material from the hopper assembly;

an auger located in said hopper assembly to convey the material to said spinner;

a gasoline-powered motor connected to drive said auger;

a drive means connected to drive said spinner;

a mounting platform for said gasoline-powered motor, said mounting platform pivotally connected to said hopper assembly; and a levelling assembly connectable between said platform and said vehicle, such that as the dump box articulates the mounting platform and thus the motor remain approximately level;

wherein said spreading apparatus is attached to the vehicle in place of the normally present tailgate, said tailgate having been removed from the vehicle.

8. The combination as recited in claim 7, where said apparatus further comprises a gearbox connected to the motor and the auger.

9. The combination as recited in claim 8, where said gearbox is configured with more than one output shaft to permit said motor to also drive said spinner.

10. The combination as recited in claim 8, further comprising a clutch connected to said motor and said gearbox.

11. The combination as recited in claim 10, wherein the clutch is electrically-operated.

12. The combination as recited in claim 11, wherein the clutch is connected to remote control means locatable in the driver's area of the vehicle.

* * * * *